(12) United States Patent
Cogswell

(10) Patent No.: US 7,779,827 B2
(45) Date of Patent: Aug. 24, 2010

(54) BLADE RING SAW BLADE

(75) Inventor: Jesse G. Cogswell, Torrance, CA (US)

(73) Assignee: Gemini Saw Company, Inc., Torrance, CA (US)

( * ) Notice: Subject to any disclaimer, the term of this patent is extended or adjusted under 35 U.S.C. 154(b) by 14 days.

(21) Appl. No.: 12/060,821

(22) Filed: Apr. 1, 2008

(65) Prior Publication Data

US 2009/0038602 A1  Feb. 12, 2009

Related U.S. Application Data

(63) Continuation of application No. 10/543,196, filed as application No. PCT/US2004/001793 on Jan. 22, 2004, now Pat. No. 7,350,518.

(60) Provisional application No. 60/442,391, filed on Jan. 24, 2003.

(51) Int. Cl.
  *B28D 1/02* (2006.01)
(52) U.S. Cl. .......................... 125/15; 451/541
(58) Field of Classification Search ............. 125/13.01, 125/12, 14, 15; 451/541, 548, 540, 546, 451/547, 180, 462
  See application file for complete search history.

(56) References Cited

U.S. PATENT DOCUMENTS

| | | | |
|---|---|---|---|
| 3,491,742 A * | 1/1970 | Weiss | ............... 125/15 |
| 3,556,074 A | 1/1971 | Nelke | |
| 3,626,921 A * | 12/1971 | Lane | ............... 125/15 |
| 3,640,027 A | 2/1972 | Weiss | |
| 3,957,593 A | 5/1976 | Haack | |
| 4,424,649 A | 1/1984 | Vincent et al. | |
| 4,436,078 A | 3/1984 | Bourke | |
| 4,576,139 A | 3/1986 | Cogswell | |
| 4,976,251 A | 12/1990 | Smith | |
| 5,351,444 A | 10/1994 | Steere, Jr. | |
| 5,471,970 A | 12/1995 | Sakarcan | |
| 5,495,844 A | 3/1996 | Kitajima et al. | |
| 5,674,119 A | 10/1997 | DesRosiers | |
| 5,951,378 A | 9/1999 | Miller et al. | |
| 5,964,210 A | 10/1999 | Hodsden | |

(Continued)

FOREIGN PATENT DOCUMENTS

DE    2121200    10/1972

(Continued)

OTHER PUBLICATIONS

European Search Report for Application No. EP00911596 dated Jun. 28, 2005 in 4 pages.

(Continued)

*Primary Examiner*—Robert Rose
(74) *Attorney, Agent, or Firm*—Knobbe Martens Olson & Bear, LLP

(57) ABSTRACT

A flat-sided annular blade for a blade ring saw for cutting hard materials such as tile along straight paths and curved paths in which the workpiece is moved through the central portion of the blade. In addition to the usual sintered abrasive diamond coating on the outer peripheral portion of the blade, the inner peripheral portion preferably is tapered to a curved inner edge and also is coated with an abrasive, preferably an electroplated diamond coating providing smoother sawing operation and a finishing action on the workpiece.

18 Claims, 1 Drawing Sheet

U.S. PATENT DOCUMENTS

| | | |
|---|---|---|
| 6,012,977 A | 1/2000 | Yoshikawa et al. |
| 6,119,675 A | 9/2000 | Akram et al. |
| 6,203,416 B1 | 3/2001 | Mizuno et al. |
| 6,354,909 B1 | 3/2002 | Boucher et al. |
| 6,632,126 B1 | 10/2003 | Cogswell |
| 6,945,850 B2 | 9/2005 | Perrey |
| 7,350,518 B2 | 4/2008 | Cogswell |
| 2003/0094078 A1 | 5/2003 | Clanton |

FOREIGN PATENT DOCUMENTS

| | | |
|---|---|---|
| DE | 2558781 | 7/1977 |
| DE | 3807094 | 9/1989 |
| DE | 4301243 | 7/1993 |
| EP | 0807493 | 11/1997 |
| WO | WO 91/02626 | 3/1991 |

OTHER PUBLICATIONS

International Search Report for Application No. PCT/US00/01374 dated Oct. 2, 2000 in 2 pages.
International Search Report and Written Opinion for Application No. PCT/US04/01793 dated Aug. 25, 2004 in 7 pages.

* cited by examiner

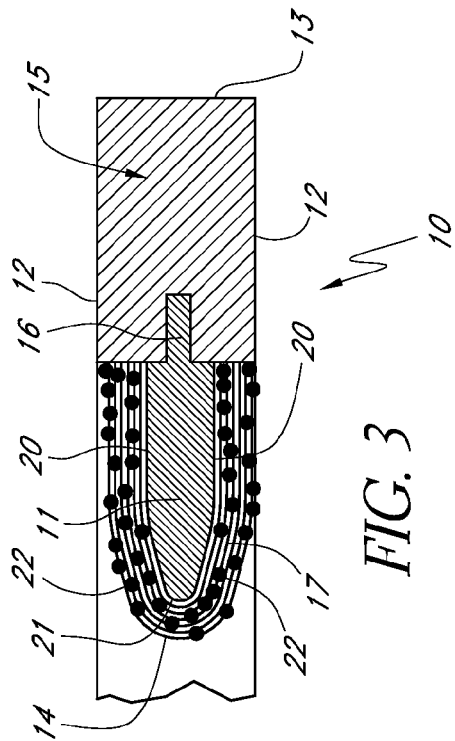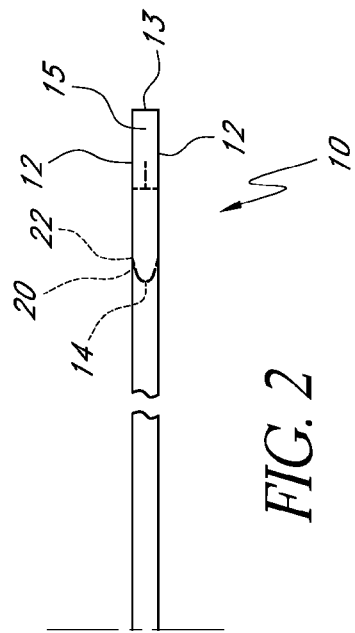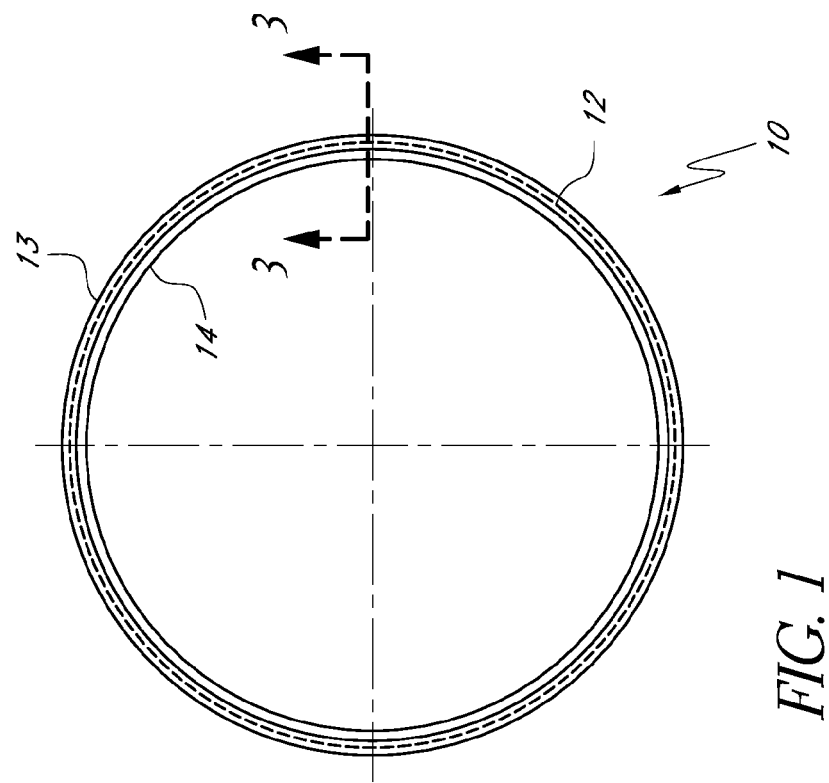

BLADE RING SAW BLADE

REFERENCE TO PRIOR PROVISIONAL APPLICATION

This application claims the benefit of prior provisional application No. 60/442,391, filed Jan. 24, 2003.

BACKGROUND OF THE INVENTION

This invention relates to abrasive saw blades of the type having a narrow, substantially flat-sided annular body typically composed of metal, an open central portion for movement of the workpiece through the blade, and an outer peripheral surface coated with an abrasive. The typical abrasive is a coating of powdered diamond particles applied in a sintering process and covering not only the outer periphery but also a portion of each flat side of the blade along the periphery. A saw assembly using blades of this type is shown in my U.S. Pat. No. 6,632,126 B1 ("the '126 patent") issued Oct. 14, 2003 and entitled BLADE RING SAW ASSEMBLY.

Saws of the type shown in the above-identified patent support the ring-shaped blade around its inner and outer peripheries and rotate the blade at high speed to cut a workpiece with the abrasive-coated outer periphery. Because the blade is narrow and the interior of the blade is open, the workpiece can be turned during the cutting operation and moved within the blade to permit the blade to cut along irregular, curving paths. A typical use of such a blade is for cutting very hard materials such as tile. The flat-sided ring has sufficient strength to be driven through the tiles at substantial cutting rates. Details of construction and operation of such a saw assembly are shown and described in the above-identified patent, and have been made public through the advertising and sale of such saw assemblies by Gemini Saw Company of Torrance, Calif., under the trademark "Revolution."

An earlier, lighter duty saw shown in U.S. Pat. No. 4,576,139, entitled "Rigid Wire Saw Wheel Apparatus For Very Hard Materials," ("the '139 patent") uses a diamond-coated wire ring that is supported and driven in a generally similar manner. This saw is designed for sawing glass and ceramics, but is not well-suited for heavy duty cutting because of limited cutting speed. With the flat-sided ring blade of the '126 patent, much greater cutting pressure can be applied and curved cuts can be made, although not as sharply curved as with a wire blade.

SUMMARY OF THE INVENTION

This invention resides in an improved flat-sided blade for blade ring saws in which the inner periphery of the ring and at least a portion of each flat side along the inner periphery also are covered with an abrasive coating, which protects the inner peripheral portion of the blade ring body from wear through contact with workpieces and, at the same time, utilizes the inner portion of the body as a grinder during the cutting of curves. This provides a smoother cutting action, a better finish on the workpiece, and the capability to cut much tighter curves. In essence, the trailing portion grinds in the opposite lateral direction from the leading portion during turning, thereby creating additional clearance for turning. Also, it is possible with such a blade to cut backwards, using the inner periphery as the leading edge.

The preferred embodiment of the invention has a sintered diamond coating on the outer peripheral portion, as shown in the '126 patent, covering part of each flat side along the outer periphery, and an electroplated diamond abrasive coating covering the inner periphery and the remainder of the unsintered body of the blade. The sintered coating is believed to provide a thicker coating with greater abrading capacity to perform the primary cutting function of the blade, and electroplating typically provides a thinner abrasive coating which does not wear away as quickly and therefore effectively protects the metal body while providing the edge-finishing function. Other coatings and coating patterns may be used, however, and the particular coating and patterns that are shown and described are not to be regarded as limitations.

An important advantage of this invention is substantially increased life of the saw blade. This is attributed to the protection of the body from damage, and the contribution of the trailing inner portion to the cutting capability after the leading outer cutting portion wears down.

BRIEF DESCRIPTION OF THE DRAWINGS

FIG. 1 is a side elevational view of a blade ring saw blade embodying the novel features of the present invention;

FIG. 2 is an enlarged fragmentary elevational view of a portion of the outer peripheral edge of the blade shown in FIG. 1; and FIG. 3 is a greatly enlarged fragmentary cross-sectional view taken along 3-3 of FIG. 1, not exactly to scale, with diamond particles indicated diagrammatically on the inner peripheral portion, of the blade.

DETAILED DESCRIPTION OF THE PREFERRED EMBODIMENT

As shown in the drawings for purposes of illustration, the presently preferred embodiment of a saw blade 10 for a blade ring saw assembly is an improvement on the basic saw blade shown in the '126 patent and sold by Gemini Saw Company as part of the "Revolution" saw, Reference is made to that patent for details of a representative saw assembly for use with a blade in accordance with the present invention. It will be evident that a blade of this type also may be used in a saw assembly of the general type shown in the '139 patent, with modifications.

As shown in the drawings, the blade 10 has a ring-shaped or annular body or core 11 (FIG. 3) of suitable tool metal, preferably a carbon steel alloy. The blade has substantially flat sides 12 between circular outer and inner peripheral edges 13 and 14, respectively, the inner peripheral edge defining a large open central portion of the blade.

The outer peripheral edge of the blade 10 is formed by an abrasive coating 15 on the body 11, preferably a sintered powered diamond coating that extends partially over each side of the body. A short radial width of the outer portion 16 of the body preferably is of reduced thickness within the sintered coating, as shown in FIG. 3, to receive a substantially greater thickness of wearable coating 15. The portion 16 of the body that is reduced thickness is a rib that is thin enough to be worn away with the diamond coating in service use without interfering with the normal cutting action of the blade.

In accordance with the present invention, at least the side walls of the body 11, and preferably the entire inner periphery of the body 11, are covered with an abrasive coating 17 that protects the body against excessive wear and smooths the contact of the blade 10 with workpiece, both for a finer finish on the workpiece and for smoother operation and better wear of the saw blade. While this coating may take various forms, including a full sintered coating for the blade (not shown), the preferred coating is an electroplated diamond coating, shown as covering the remainder of the body of the blade that is not covered by the sintered coating 15 on the outer peripheral portion 16. For functional purposes, the most important portion of the additional coating 17 is along both sidewalls close to the inner periphery, and secondarily on the inner edge 14 itself. It is convenient and preferred, however, simply to electroplate all of the body 11 that is not covered by the sintered layer, as shown.

As shown in FIGS. 2 and 3, the inner peripheral edge 14 of the blade 10 may be rounded, as indicated, to modify and soften the grinding and finishing action of the inner portion during turning of a workpiece relative to the blade. The presently preferred configuration of the body 11 of the blade 10, from the thicker outer diamond layer 15 to the inner edge, begins with substantially flat side surfaces 20 extending about halfway from the outer diamond layer 15 to the inner edge 21 of the body, and then tapering gradually at 22 toward the inner edge, at a small angle with the flat sides 20, such as between ten and twenty degrees. The inner edge 21 is rounded so that the inner edge 14 formed by the diamond coating on this edge will be similarly rounded.

Blades for this type of saw assembly can be made in various sizes according to the parameters set forth in the '126 patent. As an example of a representative blade, not to be considered specific limitations, the blade 10 can have an outside diameter of approximately ten inches, an inside diameter of approximately nine and one-quarter inches, a metal body 11 or core approximately 0.042 to 0.052 of an inch thick, reduced to approximately 0.01 inches thick in the portion 16 inside the sintered diamond layer 15. This layer may have a total thickness of approximately 0.55-0.65 of an inch and forms about one-half the radial width of the blade 10. The electroplated coating 17 covers the remainder of the body 11, to a thickness that preferably is not greater than the thickness of the sintered portion 15 on each side of the body, and may be slightly thinner so as to follow closely within the space, or "kerf" (not shown), cut in a workpiece during a straight cut, to avoid unnecessary enlargement of the kerf. The rounded inner edge 21 may be sized and shaped to produce an inner radius for the electroplated diamond coating on the order of 0.330 to 0.340 of an inch, the entire coating being approximately 0.010 to 0.015 of an inch thick.

Upon turning of the workpiece relative to the blade 10 to make a curved cut, the trailing inner edge 14 and the inner peripheral portion will swing out, relative to the direction of curvature, as the opposite side of the leading edge portion swings in, thereby moving into engagement with the curved side edge of the workpiece that has been formed by the cutting action of the leading edge of the blade. Because of the slight taper of the inner edge portion 22 of the body 11 and the corresponding taper of the inner diamond layer 17, this swinging action on both sides of the inner edge will, in effect, slightly delay the contact of the inner diamond coating, at the inner edge, with the edge surface of the saw kerf, and thus will avoid harsh or excessive cutting engagement at the inner edge. This occurs in both directions of curvature, and produces a smoother cutting action of the blade 10 as well as a fine finishing or smoothing operation on the sidewalls of the workpiece.

Further, providing an abrasive coating on the inner peripheral edge 14 of the blade 10 provides the blade with the ability to cut reversely as well, during which the outer coating serves the smoothing and finishing function performed by the inner coating 17 during forward operation. This is a bonus value of the blade, which is designed for one-direction cutting movement as its primary function but sometimes can be operated to advantage in reverse.

It bears emphasis that the invention is an improvement in a flat-sided ring blade of the type disclosed in the '126 patent, in which the outer peripheral portion of the blade is coated with an abrasive coating to form an outer cutting element and the inner edge surface of the ring was bare metal. This had a tendency to cause blade wobble upon contact with a workpiece in the later stages of the life of a blade. Covering the exposed inner portion of the blade with abrasive cutting material not only provides a finishing action but also reduces blade wobble and maintains stability, and produces a substantial increase in the usable life of the blade.

Also to be noted is the fact that different abrasive coatings may be used on different portions of the blade 10, with similar but somewhat varying results. Sintered diamond particles buried in powdered metal provide more effective cutting action than electroplated diamond particles, which typically provide a thinner layer. While an electroplated diamond coating could be used on the entire body, the preferred combination shown herein is believed to provide for optimum results—greater cutting capacity for the outer, primary cutting element and a durable abrasive coating for the inner, secondary cutting element.

A variety of different dimensions can be provided for a saw blade of this type, and a variety of abrasive coatings may be provided, all within the knowledge of those who are skilled in this art. This description is of a representative embodiment of the invention. Other modifications within the spirit and scope of the invention will be apparent to those skilled in the art.

The invention claimed is:

1. A blade ring saw blade for making straight and curved cuts in hard workpieces, having, in combination:
   an outer peripheral edge and an inner peripheral edge defining a large central opening for relative movement of the workpieces through the blade during making of curved cuts, the large central opening defining a radius that is greater than the annular width of the blade between the inner and outer peripheral edges;
   an annular body;
   an abrasive coating on said body defining said outer peripheral edge and substantially flat outer portions of sidewalls of the blade adjacent said outer peripheral edge; and
   an abrasive coating on said body defining said inner peripheral edge and substantially flat inner portions of sidewalls of the blade,
   wherein the abrasive coating on said body defining said outer peripheral edge is different from the abrasive coating on said body defining said inner peripheral edge, the abrasive coating on said body defining said outer peripheral edge comprising sintered diamond particles and the abrasive coating on said body defining said inner peripheral edge comprising electroplated diamond particles.

2. A blade ring saw blade as defined in claim 1 wherein at least a portion of said abrasive coatings comprises a sintered diamond particle coating.

3. A blade ring saw blade as defined in claim 1 wherein at least a portion of said abrasive coatings comprises an electroplated diamond particle coating.

4. A blade ring saw blade as defined in claim 1 wherein said sidewalls are substantially parallel adjacent said outer peripheral edge and taper inwardly adjacent said inner peripheral edge.

5. A blade ring saw blade as defined in claim 4 wherein said inner peripheral edge is rounded.

6. A blade ring saw blade for making straight and curved cuts in hard workpieces, having, in combination:
   an annular metal core having substantially flat sides;

inner and outer peripheral edges and a central opening for permitting relative movement of the workpieces through the annular metal core during cutting of curves, the central opening defining a radius that is greater than the annular width of the blade between the inner and outer peripheral edges;

an abrasive coating defining the outer peripheral edge for cutting in a forward direction; and an abrasive coating defining the inner peripheral edge for finishing the edge of the workpiece during cutting of curves, wherein the abrasive coating on the outer peripheral edge portion of said core is different from the abrasive coating on the inner peripheral edge portion of said core, the abrasive coating on the outer peripheral edge portion of said core comprising sintered diamond particles and the abrasive coating on the inner peripheral edge portion of said core comprising electroplated diamond particles.

7. A blade ring saw blade as defined in claim 6 wherein at least a portion of said abrasive coatings comprises a sintered diamond particle coating.

8. A blade ring saw blade as defined in claim 6 wherein at least a portion of said abrasive coatings comprises an electroplated diamond particle coating.

9. A blade ring saw blade as defined in claim 6 wherein said abrasive coating is selected from the group comprising sintered diamond particle coatings and electroplated diamond particle coatings.

10. A blade ring saw blade for making straight and curved cuts in hard workpieces, having, in combination:

a ring-shaped body having substantially flat sides and narrow inner and outer peripheral edges, and a portion of reduced thickness forming a rib extending outwardly from said outer peripheral edge around the body;

an abrasive coating thicker than said body extending around said outer peripheral edge on said rib and forming an outer peripheral cutting element for said blade for making the curved and straight cuts in the workpieces; and an abrasive coating covering the flat sides and inner peripheral edge of the body to form an inner peripheral cutting element for finishing curved cuts in the workpieces and providing smoother action as well as for cutting reversely;

said inner peripheral edge and said abrasive coating thereon defining an open central portion of said blade permitting the workpieces to be turned relative to said blade to make the curved cuts.

11. A blade ring saw blade as defined in claim 10 wherein at least a portion of said abrasive coatings comprises a sintered diamond particle coating.

12. A blade ring saw blade as defined in claim 10 wherein at least a portion of said abrasive coatings comprises an electroplated diamond particle coating.

13. A blade ring saw blade as defined in claim 12 wherein said inner cutting element is thinner than said outer cutting element.

14. A blade ring saw blade as defined in claim 10 wherein said abrasive coatings include at least one of a sintered diamond particle coating and electroplated diamond particle coating.

15. A blade ring saw blade as defined in claim 10 wherein said body has sides that are substantially flat adjacent said portion of reduced thickness and then taper inwardly toward said inner peripheral edge, and has a curved inner edge.

16. A blade ring saw blade as defined in claim 10 wherein said blade has an outside diameter of approximately ten inches, an inside diameter of approximately nine and one-quarter inches, a metal body approximately 0.042 to 0.052 of an inch thick, a first cutting element approximately 0.55 to 0.65 of an inch thick, and a second cutting element having a thickness less than the thickness of the first cutting element.

17. The blade ring saw blade of claim 10, wherein a first abrasive coating is provided around said outer peripheral edge and a second abrasive coating covers the flat sides and inner peripheral edge.

18. The blade ring saw blade of claim 1, wherein the annular body defines substantially flat sides that are substantially wider than the thickness of said edges.

* * * * *

UNITED STATES PATENT AND TRADEMARK OFFICE
CERTIFICATE OF CORRECTION

| | |
|---|---|
| PATENT NO. | : 7,779,827 B2 |
| APPLICATION NO. | : 12/060821 |
| DATED | : August 24, 2010 |
| INVENTOR(S) | : Jesse G. Cogswell |

Page 1 of 1

It is certified that error appears in the above-identified patent and that said Letters Patent is hereby corrected as shown below:

At Column 1, Line 6-7, please change "This application claims the benefit of prior provisional application No. 60/442,391, filed Jan. 24, 2003." to --This application is a Continuation of U.S. Patent Application Serial No. 10/543,196 filed on June 19, 2006, now U.S. Patent No. 7,350,518, which is a U.S. National Phase under 35 U.S.C. § 371 of International Application No. PCT/US2004/001793 filed January 22, 2004 and published in English on August 12, 2004, which claims the benefit of priority of U.S. Provisional Application No. 60/442,391 filed on January 24, 2003, the full disclosure of each of which is incorporated by reference in its entirety herein.--.

At Column 2, Line 27, please change "portion," to --portion--.

At Column 2, Line 36, please change "saw," to --saw.--.

Signed and Sealed this
Nineteenth Day of April, 2011

David J. Kappos
*Director of the United States Patent and Trademark Office*